United States Patent
Messina et al.

(10) Patent No.: US 7,689,060 B2
(45) Date of Patent: Mar. 30, 2010

(54) DIGITAL IMAGE PROCESSING METHOD TRANSFORMING A MATRIX REPRESENTATION OF PIXELS INTO A VECTOR REPRESENTATION

(75) Inventors: Giuseppe Messina, Giardini Naxos (IT); Mirko Ignazio Guarnera, Gela (IT); Agostino Costanzo, Carlentini (IT); Sebastiano Battiato, Acicatena (IT); Giovanni Gallo, Catania (IT); Salvatore Nicotra, Giarre (IT)

(73) Assignee: STMicroelectronics SRL, Agrate Brianza (MI) (IT)

( * ) Notice: Subject to any disclaimer, the term of this patent is extended or adjusted under 35 U.S.C. 154(b) by 1125 days.

(21) Appl. No.: 11/259,937

(22) Filed: Oct. 27, 2005

(65) Prior Publication Data

US 2006/0104532 A1 May 18, 2006

(30) Foreign Application Priority Data

Nov. 12, 2004   (IT)   ............... RM04A0563

(51) Int. Cl.
*G06K 9/36* (2006.01)
*G06K 9/38* (2006.01)
*G06K 9/46* (2006.01)

(52) U.S. Cl. ...................... 382/276; 382/253
(58) Field of Classification Search ................. 382/276, 382/253
See application file for complete search history.

(56) References Cited

U.S. PATENT DOCUMENTS

| | | | |
|---|---|---|---|
| 4,097,845 A * | 6/1978 | Bacus | 382/134 |
| 6,317,223 B1 * | 11/2001 | Rudak et al. | 382/275 |
| 6,912,309 B2 * | 6/2005 | Lee | 382/197 |
| 6,985,612 B2 * | 1/2006 | Hahn | 382/128 |
| 7,231,086 B2 * | 6/2007 | Abousleman et al. | 382/199 |
| 2003/0185420 A1 * | 10/2003 | Sefcik et al. | 382/103 |
| 2006/0067585 A1 * | 3/2006 | Pace | 382/243 |
| 2006/0228009 A1 * | 10/2006 | Fidrich et al. | 382/128 |

OTHER PUBLICATIONS

Adrian N. Evans, "Morphological gradient operators for colour images", 2004 International Conference on Image processing, Oct. 24-27, 2004, vol. 5, p. 3089-3092.*

Dai et al. "A feature-based image registration algorithm using improved chain-code representation combined with invariant moments", IEEE Transactions on Geoscience and Remote Sensing, Sep. 1999, vol. 37, Issue: 5, Part 2, p. 2351-2362.*

Tamir et al. "Efficient chain-code encoding for segmentation-based image compression", Data Compression Conference, 1996. DCC Proceedings p. 455.*

(Continued)

*Primary Examiner*—Samir A. Ahmed
*Assistant Examiner*—Li Liu
(74) *Attorney, Agent, or Firm*—Hogan & Hartson LLP

(57) ABSTRACT

A method for transforming a matrix representation of pixels of an image into a vector representation of the image involves partition of the image into contiguous homogeneous regions by applying a watershed type morphologic algorithm to the matrix representation of pixels and identifying the contours of the contiguous homogeneous regions by applying a vector code contouring algorithm of the chain-code type to every region. By selecting quantization level of the gradient, improved image quality, dimensions and noise are achieved.

10 Claims, 5 Drawing Sheets

OTHER PUBLICATIONS

Sun et al. "A fast watershed algorithm based on chain code and its application in image segmentation", Pattern Recognition Letters 26 (2005) 1266-1274.*

Vincent, et al. "Watersheds in Digital Spaces: An Efficient Algorithm Based on Immersion Simulations"; IEEE Transactions on Pattern Analysis and Machine Intelligences; Jun. 1991; vol. 13, No. 6.

* cited by examiner

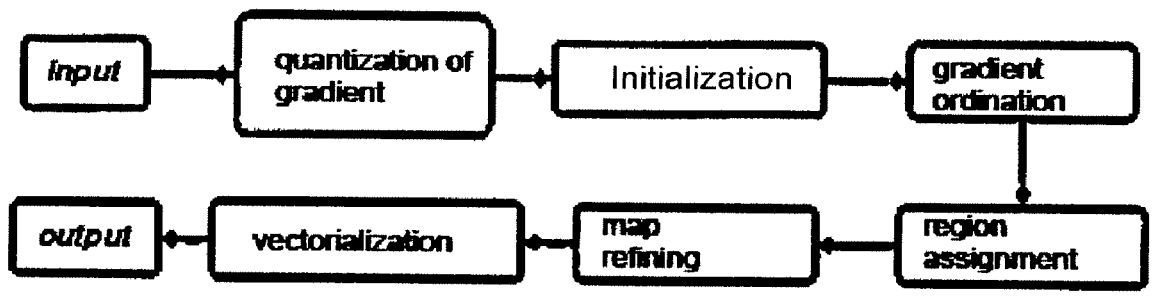
FIG. 3
| gradient levels | pixel | | | | |
|---|---|---|---|---|---|
| 0 | (1,1) | (2,1) | (4,2) | (4,3) | ... |
| 1 | (1,3) | (2,3) | | | |
| 2 | (2,2) | ... | | | |
| ... | | | | | |
| ... | | | | | |
| 254 | (4,6) | (5,5) | (6,5) | (7,6) | (8,6) |
| 255 | ... | | | | |
FIG. 4
Method 1
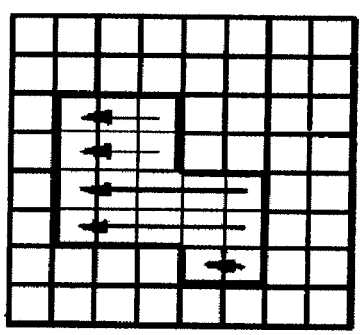
FIG. 5

DIGITAL IMAGE PROCESSING METHOD TRANSFORMING A MATRIX REPRESENTATION OF PIXELS INTO A VECTOR REPRESENTATION

RELATED APPLICATION

The present application claims priority of Italian Patent Application No. RM2004A000563 filed Nov. 12, 2004, which is incorporated herein in its entirety by this reference.

FIELD OF THE INVENTION

The present invention relates to the processing of digital images and in particular to a method for transforming a matrix representation of pixels of an image into a vector representation.

BACKGROUND OF THE INVENTION

Digital images are currently used in many applications, for example in new generation acquisition devices, such as digital cameras or DSC (Digital Still Camera). Moreover, digital images are becoming more widely used in portable multimedia communication terminals.

Typically, a digital image is represented by a pixel matrix. The total number of pixels present in said matrix defines the spatial resolution of the image. Each pixel is identified by a pair of spatial coordinates that correspond to the position of the pixel inside the matrix and by one or more digital values associated to it, each of which represents a parameter of the pixel. For example, three digital values are associated to each pixel in an RGB format color digital image, representative of the following parameters respectively: intensity of the red color component, intensity of the green color component and intensity of the blue color component.

In numerous applications, representation of a digital image as a pixel matrix is not optimal because it requires a large quantity of memory and it cannot be enlarged at will without this leading to a considerable loss in quality.

It is known that a digital image can be stored and processed with a method known in the art as vector representation or format. A method that uses this format provides for the image to be represented as a plurality of regions that are not superimposed but altogether cover the entire image. The information necessary to define the contours of said regions are stored, while the information regarding the pixel parameters comprised in each region are summarized in a few parameters generically associated to the entire region or only associated with a limited number of pixels in the region. It can be seen from the above that transformation of a digital image originally represented by means of a pixel matrix to a corresponding image represented by means of the above-described vector format method leads to a reduction in the quantity of information necessary to describe the image and, therefore, to a greater image transmission speed and a lower memory requirement for its storage.

It is known, furthermore, that in particular applications, such as zooming techniques and processing techniques in general that require an increase/decrease (i.e. resizing) in the spatial resolution of the image, vector representation is more convenient and efficient than pixel matrix representation.

It has been observed that numerous raster-to-vector conversion methods belonging to the state of the art, even if widely used, do not guarantee satisfactory performance in terms of the dimensions occupied by the vectorized images and in terms of the measured or perceived quality of said images.

SUMMARY OF THE INVENTION

The method of the present invention provides a raster-to-vector conversion without the above-described disadvantages of the methods known in the art.

The method for transforming a matrix representation of pixels of an image into a vector representation of the image according to the present invention involves partition of the image into contiguous homogeneous regions by applying a watershed type morphologic algorithm to the matrix representation of pixels and identifying the contours of the contiguous homogeneous regions by applying a vector code contouring algorithm of the chain-code type to every region. By selecting quantization level of the gradient, improved image quality, dimensions and noise are achieved.

The method of the present invention can be realized by a computer program product including code instructions that, if loaded and executed inside a data processor, processes the image as described above.

BRIEF DESCRIPTION OF THE DRAWINGS

Further features and advantages of the present invention will become more apparent from the following detailed description of an exemplary but non-limiting embodiment thereof, as illustrated in the accompanying drawings, wherein:

FIG. 3 is a block diagram of the entire raster to vector conversion algorithm according to the method of the invention;

FIG. 4 represents a histogram of the gradient used in an exemplary embodiment of the method according to the invention;

FIG. 5 illustrates a gradient histogram scansion method;

DETAILED DESCRIPTION

A morphological watershed algorithm was described by Luc Vincent and Pierre Soille in an article entitled "Watersheds in digital spaces: An efficient algorithm based on immersion simulations" published in IEEE PAMI, 1991.

The watershed algorithm is used to decompose the image into a number (typically large) of sub-regions, called basins. Partitioning of the image into basins takes place by means of a simple classification technique that is described in further detail below.

The concept at the basis of the watershed algorithm is to consider the image as if it were three-dimensional: two dimensions that define the spatial coordinates of the image (height and width), and one dimension (depth) that defines the levels of gray.

In this topographical interpretation of the image, three types of points can be considered:

1) Points belonging to "regions of minimum";
2) Points where, if a drop of water fell, it would certainly "slide" towards a region of minimum; and
3) Points where a drop of water would slide with the same probability towards one or another region of minimum.

For each region of minimum, the points that satisfy condition (1) are called catchment basins; the points that satisfy condition (3), and that define the edges of the image, are called watershed lines.

The main objective of this partitioning or decomposition algorithm is to find the watershed lines. The basic idea is simple. Imagine making a hole in each region of minimum and uniformly filling the entire image with water through these holes. Gradually the water level in the different basins rises until, when the water in one basin is about to overflow into another, a dam is built to prevent the union of the two different basins. The boundaries drawn by the dams are the watershed lines.

According to this embodiment of the invention, the image gradient is calculated before execution of the watershed algorithm.

Figure 1:
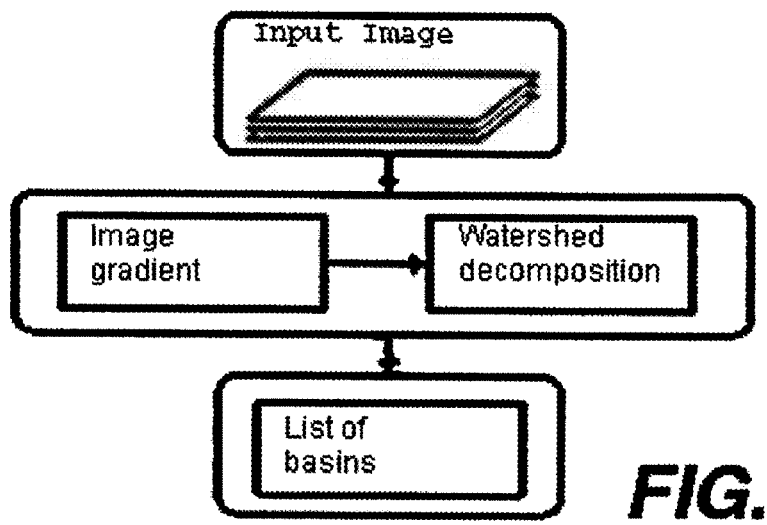
FIG. 1 is a block diagram that concisely shows the processing operations of an image by means of a watershed algorithm used in the method according to the invention.

The gradient provides information on the variation in tones for each level corresponding to a different parameter of the pixels that make up the image, i.e. for each color level. In practice, the gradient indicates how each pixel differs from the surrounding pixels. Therefore, the image obtained by calculating the gradient highlights the contours of the objects portrayed. At the end of the decomposition algorithm, a list of basins is obtained. The above-mentioned operations are represented schematically in the block diagram in FIG. 1.

Calculation of the gradient is based on the calculation of the partial derivative $$G_x = \frac{\partial f}{\partial x} \text{ and } Gy = \frac{\partial f}{\partial y}$$

for each pixel (x,y) of the image ($G_x$ and $G_y$ represent the gradient along a direction x and the gradient along a direction y respectively). This calculation can be approximately obtained by using Sobel Filters and the convolution operators in the algorithm can be briefly described according to the following Table 1:

TABLE 1

| | |
|---|---|
| Input: | Let I be the image and $I_k$ the k-layer of the image I (for a RGB image k = 3). |
| Output: | G(x,y) (image gradient) |
| Method: | $G_k = \sqrt{G_{x,k}^2 + G_{y,k}^2}$ |
| | $G_{xk} = S_x * I_k$ and $G_{yk} = S_y * I_k$ |

Where the symbol * is the convolution operator and $S_x$ and $S_y$ are Sobel filters:

$$S_x = \begin{pmatrix} -1 & -2 & -1 \\ 0 & 0 & 1 \\ 1 & 2 & 1 \end{pmatrix} \quad S_y = \begin{pmatrix} -1 & 0 & 1 \\ -2 & 0 & 2 \\ -1 & 0 & 1 \end{pmatrix}$$

The gradient can be calculated by choosing between the Lmax and L2

TABLE 1-continued metrics:
$G_{LMax} = \text{Max}(G_k(x,y))$ $$G_{L2} = \sqrt{\sum_{k=1}^{\#layer} G_k^2} \; \forall \; (x, y) \in G_k \ldots k = 1 \ldots \# \text{layers}$$

The method described in this algorithm calculates the gradient relative to each color level of the image. The final calculation of the gradient, which unites all the information obtained for each color level, is obtained by using one of the metrics known with the symbols $L_{Max}$ and $L_2$. The calculated values provide the gradient map. Before proceeding with the watershed algorithm, the gradient map is normalized on 256 levels.

After the processing step using the watershed algorithm, a list of basins is obtained from the gradient map. This list is then processed by the chain-code automata, described hereunder, obtaining a vector image as an output. The number of vectors (primitives) of the raster-to-vector converted image is, naturally, equal to the number of basins calculated by the watershed algorithm. Therefore, the greater the number of basins, the greater is the definition of the resulting image. For visualization of vector images on portable devices (that have a small display), the images are over-segmented, i.e. with an excessive quantity of vectors for the visualization capacity of the display. The quality of the image (and, therefore, the number of vectors) can be reduced to the advantage of the final dimensions of the image itself.

In this embodiment of the invention, the watershed algorithm is optimized so as to make it possible to obtain images whose quality and dimensions can be modified within vast limits, making use of gradient quantization.

The method used for quantization of the gradient map is described in the following algorithm:

| | |
|---|---|
| Input: | Let G(x, y) be the gradient map |
| Output: | $G_k(x, y)$ quantized gradient map with k = 0.1, . . . , 1 and steps of 0.1 |
| Method: | $G_k(x, y)$ = floor (G(x, y) * k) where * is the multiplication operator and floor approximates the resulting number to the nearest lower integer. |

For example, by multiplying every pixel of the gradient map G by a factor K equal to 0.1, a map is obtained where the possible tones of gray for each pixel are 25 instead of 256.

Figure 2:
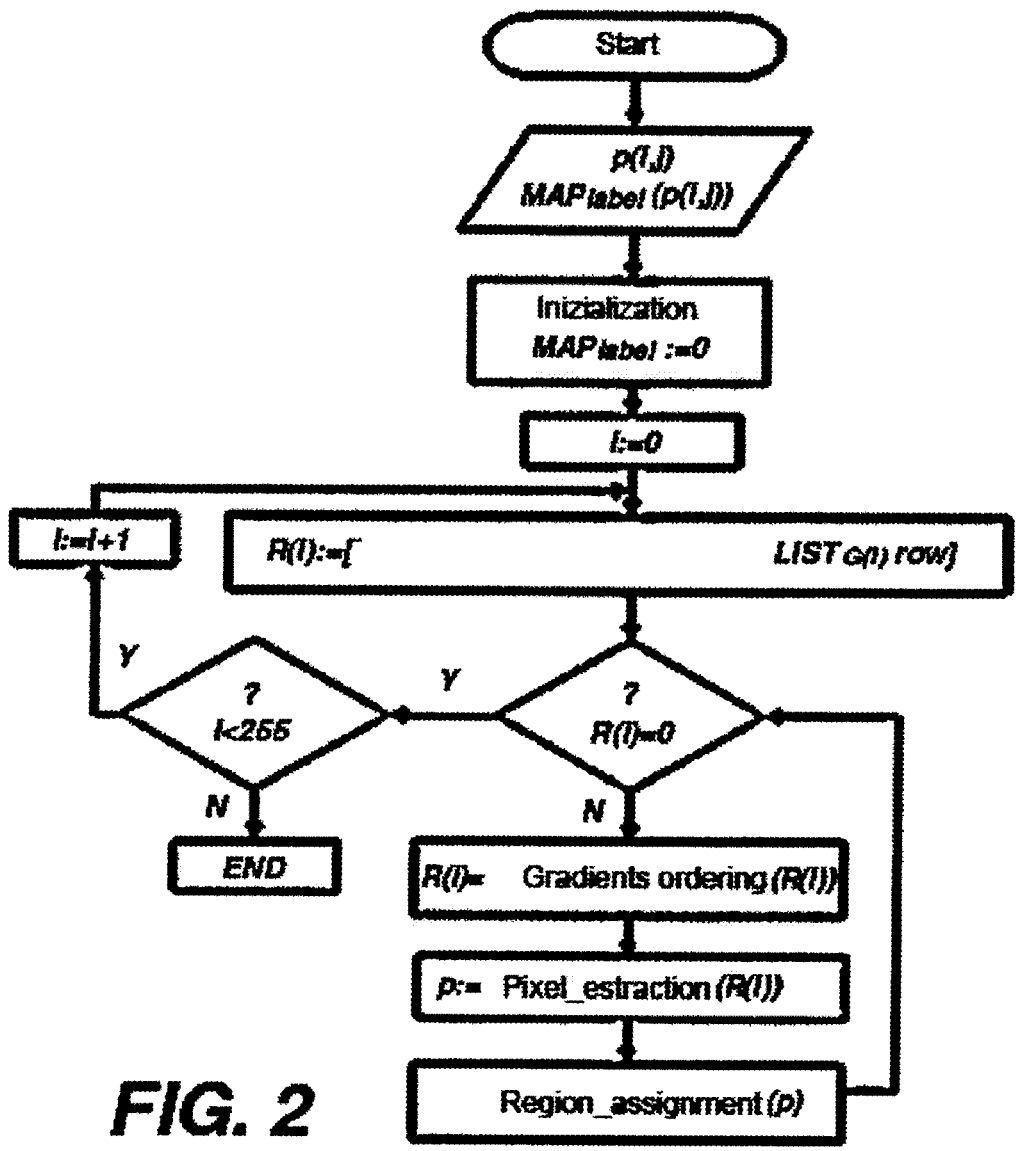
FIG. 2 is a flow diagram of the watershed algorithm.

With reference to the flow diagram in FIG. 2 and to the block diagram in FIG. 3, the watershed decomposition algorithm is made up of the following four consecutive steps:

1. Initialization of the gradient histogram, of the basin map and of the basin list;
2. Ordination of the gradient: this step is not provided for in the known watershed algorithm and makes it possible to control the morphology of the basins and their number;
3. Assignment of the regions: basin classification procedure; and
4. Refinement of the map: procedure to assign the edge pixels to the most similar adjacent region.

Step 1: Initialization.

In order to make use of the information on the gradient levels of the image, a structure called gradient histogram is used. FIG. 4 shows an example of a gradient histogram.

The list of pixels at one level is stored in each element of the list, taking on a field of values from 0 to 255.

The initialization step also includes provision of a basin list and a labeled map ($Map_{label}$). The basin list contains the following information:

The label of the corresponding basin;
A dynamic list of the pixels that form part of the basin;
The average value of the basin for each color level of the original image (the average is updated each time a pixel is added to the list); and
The number of pixels that form part of the basin.

The labeled map called $Map_{label}$ is a matrix with the same dimensions as the original image where, in the position of each pixel, the label of the basin to which said pixel belongs, is stored.

The labeled map is initialized at 0. The labels vary from 1 to n (n=maximum number of basins).

A pixel can be classified temporarily during the watershed decomposition as an "edge" pixel and, in this case, its label in the $Map_{label}$ is set at the special value of −1.

It is important to note that the order with which the pixels are processed has an influence on the final result, i.e. on the basin morphology and on the number of said basins. Two methods are described hereunder that act by sorting the elements in the gradient histogram according to different principles, before the pixels are extracted and classified. During the successive step, watershed decomposition assigns a basin to each pixel that does not form part of the edge (setting the edge pixels at the temporary value of −1), and subsequently reclassifies the edge pixels assigning them to the most similar adjacent basin. Here too, the assignment criterion is guided by a metric that acts on the concept of similarity.

Step 2: Gradient Ordination.

The gradient histogram is created by scanning the image, starting from the coordinate pixel p (0,0) up to the pixel p (n, m), (n and m indicate the number of rows and columns of the image respectively). During scanning, each pixel is assigned to a location in the gradient histogram, corresponding to its own level. In the next step, the pixels are extracted from the list to be classified. Therefore, the pixels are extracted in the reverse order of their insertion, according to the method hereinafter indicated as Method 1.

This scanning affects the number and the morphology of the basins that take on a typically elongated and vertical shape. (This effect is particularly noticeable with images that have large areas of homogeneous color or when quantization of the low gradient is selected).

In order to sort the pixels to be processed, Method 1, as shown in FIG. 5, looks for the nearest pixels, starting from the first pixel in the gradient histogram list and, by measuring the distance, identifies those pixels of the list that geometrically have a minimum distance. Then, by repeating the process, an sorted list of pixels is created.

Alternatively, two other methods can be used: the first privileges the pixels on the right or on the left of the current pixel, while the second privileges the pixels above or below the current pixel.

Figure 6:
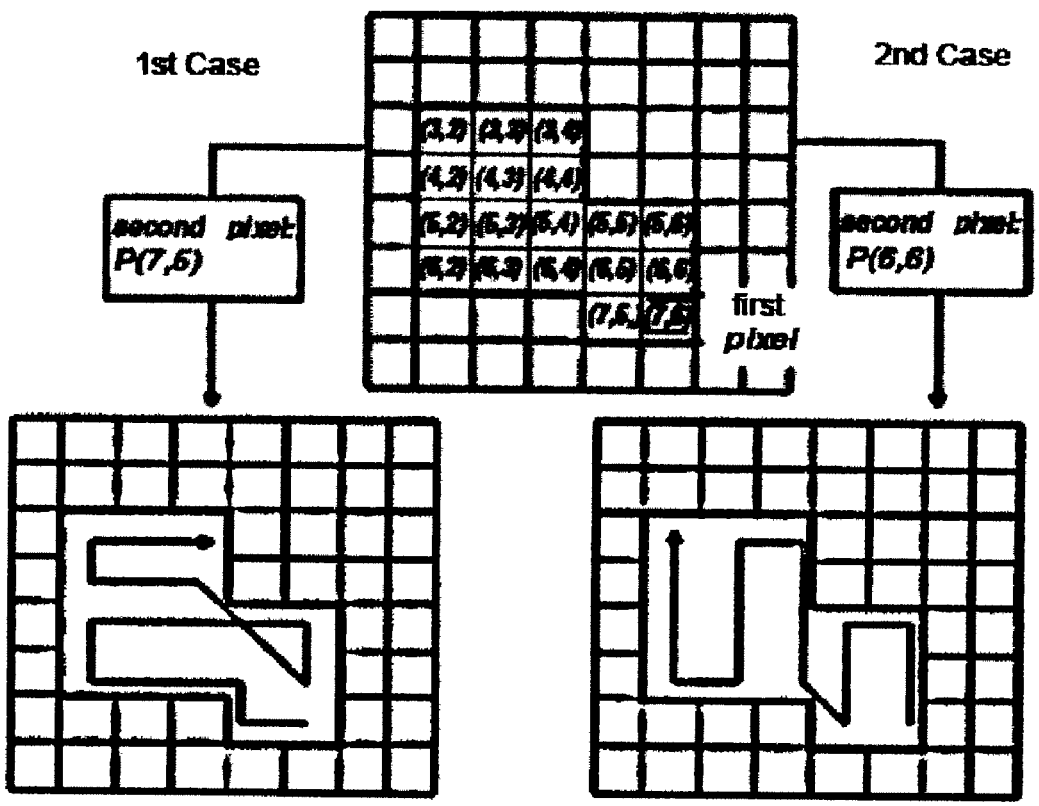
FIG. 6 illustrates other two gradient histogram scansion methods.

In the example illustrated in FIG. 6, the highlighted pixels do not necessarily form part of the same basin (because the basin still has to be created), but they form part of the same gradient histogram list.

The scansion of the list in the first case is indicated as Method 2 and that of the second case is indicated as Method 3.

The following Table 2 that refers to images (not represented, identified as "Lena" and "Circles") shows that, with a quantization level k=0.1, the number of basins in Methods 2 and 3 increases only slightly compared to Method 1. In spite of this, a considerable improvement of the image was noted. The perceptive difference in the case of quantization k=1 in the three methods implemented is irrelevant.

TABLE 2

| Image | Method | No. of basins with quantization K = 0.1 | No. of basins with quantization K = 1 |
|---|---|---|---|
| Lena | 1 | 8031 | 22000 |
|  | 2 | 11519 | 22921 |
|  | 3 | 11505 | 22892 |
| Circles | 1 | 16 | 94 |
|  | 2 | 4 | 60 |
|  | 3 | 5 | 74 |

Step 3: Assignment of Regions

In the second step of the watershed decomposition algorithm, the pixel selected by the sorting procedure is classified, depending on the case, as a pixel belonging to a new basin (the number of labels is increased), as an edge pixel or as a pixel belonging to an already existing basin.

Case 1. If the pixel has not be assigned to a region and there are no other regions in the neighborhood, a new region is created and the pixel is assigned to it.

Case 2. If the pixel has not been assigned to a region and there are two or more regions in the neighborhood, it is classified as an edge pixel.

Case 3. If the pixel has not been assigned to a region and there is only one region in the neighborhood, the pixel is assigned to it.

Figure 7:
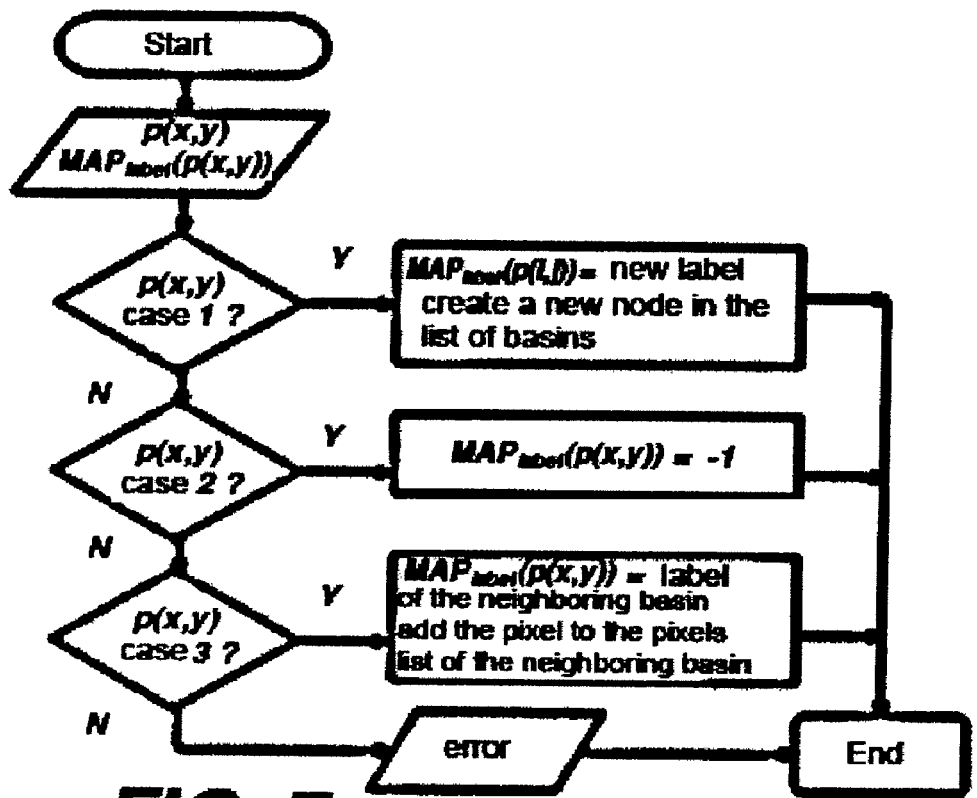
FIG. 7 is a flow diagram of the procedure to assign labels to the pixels of a gradient histogram list.

FIG. 7 illustrates the flow diagram of the procedure to assign a label to the pixels in the gradient histogram list.

At this point, the importance of the pre-sorting of the pixels involved in the assignment procedure becomes evident, since the choice of a pixel in a position of one particular sequence rather than another can make it become an edge pixel, can aggregate it to an existing region or can cause the creation of another.

Step 4: Map Refinement

At the end of the region assignment step, all the pixels have been processed and assigned to a region or they have been marked with the special value −1, indicating that they are edge pixels. A basin map of the type shown in FIG. 8 is obtained.

Figures 8, 9, 10:
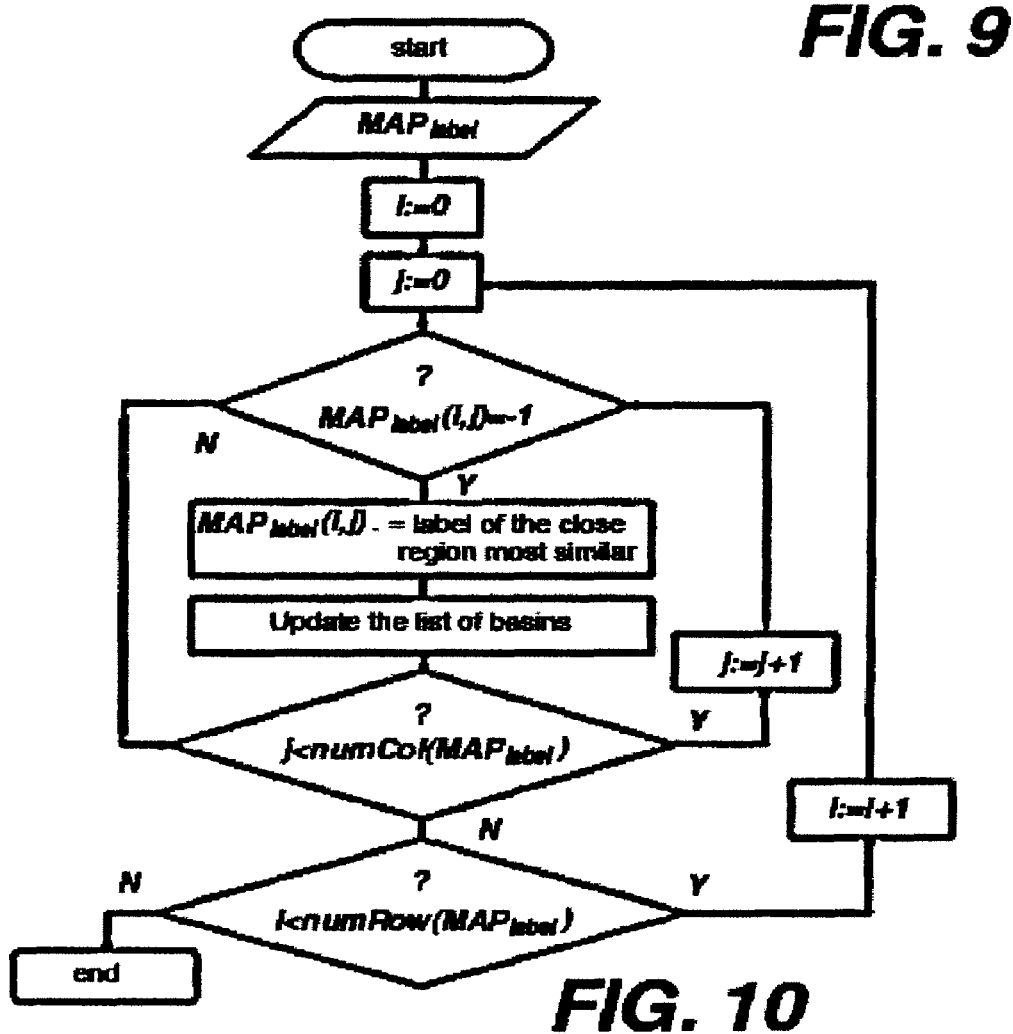
FIG. 8 shows an example of a portion of a basin map.
FIG. 9 shows an example of a basin map refinement operation.
FIG. 10 is a flow diagram of the basin map refinement operation.

The third algorithm step scans the basin map $MAP_{label}$ and assigns each pixel, classified as edge pixel, to the most similar adjacent region, as shown in FIG. 9. The similarity is estimated by considering the distance between the value (color) of the processed edge pixel and the average value of each basin in the neighborhood of the pixel itself. The distance is calculated by choosing between two metrics Lmax and L2.

Details of the map refining step are illustrated in the flow diagram given in FIG. 10.

The image resulting from the watershed algorithm is made up of a set of interconnected basins, i.e. homogeneous and contiguous regions, and can be efficiently represented by Scalable Vector Graphics (SVG). According to the method of the invention, each basin is represented with a contouring vector code algorithm of the type known as "chain code". With this algorithm each region is represented by a sequence of segments with a given direction and size.

Figure 11:
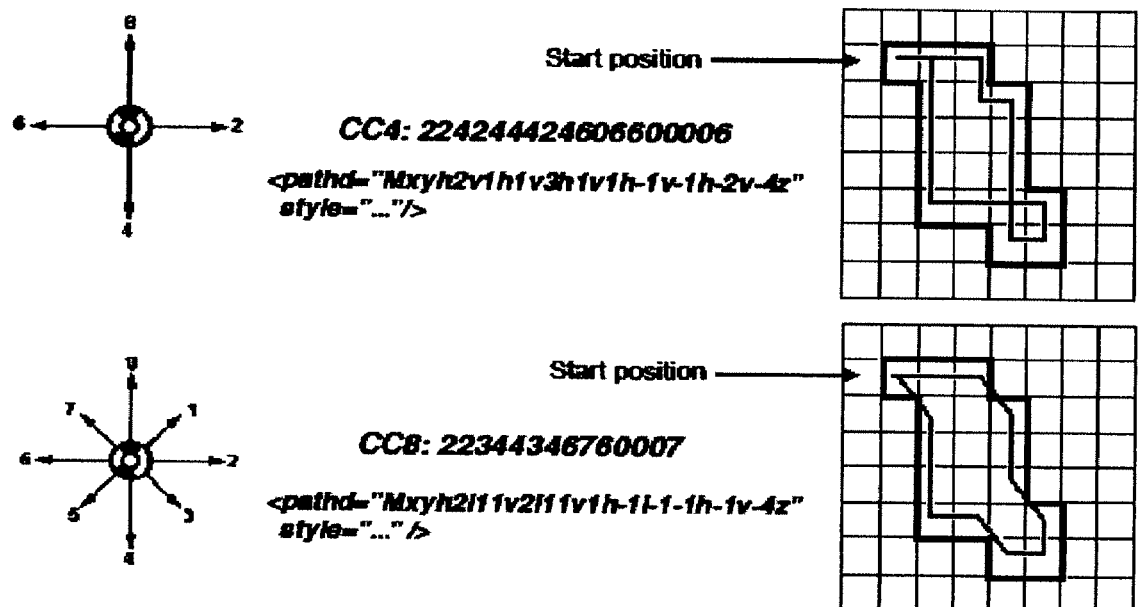
FIG. 11 shows an example of vector representation of an elementary region of an image.

Typically, schemas with four or eight directions are used. In FIG. 11 an example of chain code description of a basin is given. In the top part of the figure, the basin is represented with a four-direction schema (4CC) and in the bottom part the same basin is represented with an eight-direction schema (8CC).

In particular, a deterministic automaton is implemented to create a chain code for each basin. Starting from the pixel at the top left point of the basin perimeter, the algorithm looks for the next adjacent pixel following a clockwise direction. Both the state of the automata and vector description with the relative position code are updated while search continues until the path returns to the first pixel.

In order to achieve SVG representation of the chain code of each basin the primitive PATH is used whose formal syntax is path=d<" . . . " style=" . . . ">. The attribute d contains both instructions and coordinate points. A brief summary of the basic commands for the primitive PATH is given in the following Table 3.

TABLE 3

| Command | Name | Argument | Description |
| --- | --- | --- | --- |
| M, m | Moveto | Xy | Starts a new sub-plot. M and m indicate that the coordinates that follow are absolute or relative respectively |
| L, l | Lineto | Xy | Draws a line from the point to (x, y). L and l indicate that the coordinates that follow are absolute or relative respectively. |
| H, h | horizontal lineto | P | Draws a horizontal line from the point (x, y) to the point (x + P, y). H and h indicate that the coordinates that follow are absolute or relative respectively. |
| V, v | vertical lineto | P | Draws a vertical line from the point (x, y) to the point (x, y + P). V e v indicate that the coordinates that follow are absolute or relative respectively |
| Z, z | closepath | None | Closes the current path by drawing a straight line from the current point to the initial point of the current sub-path. |

The properties of the "styles" relative to the primitive PATH are:
  stroke, stroke-width: the color and the width of the external line respectively
  fill: the color of the basin (the average color of the pixels).
In CC4 representation, the coordinates of the initial, final and curvature points are increased by 0.5 pixels in order to better fill the raster points of the image.

In CC8 representation, the diagonal lines prevent coverage of the entire pixel area. In these cases the optimal size of the line can be calculated as:

$$\text{Stroke-width} = C = \sqrt{a^2+b^2} = \sqrt{1^2+1^2} = \sqrt{2} = 1.41.$$

Figure 12:
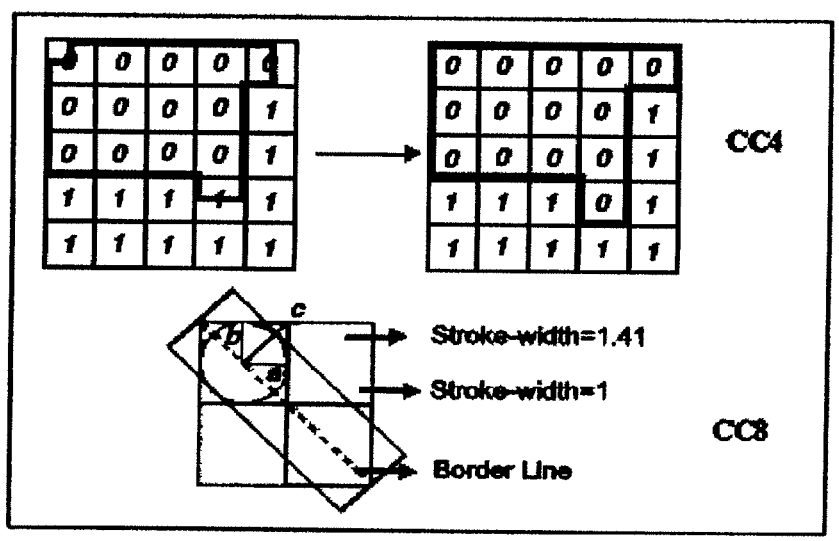
FIG. 12 illustrates two quantization techniques that can be used with the method according to the invention.

FIG. 12 illustrates the two techniques described above for CC4 and CC8 representation.

Experimental results have shown that, using the method according to the invention, a very versatile and efficient vector representation of digital images is obtained. In particular, the possibility of choosing the quantization level of the gradient enables optimization of the result in terms of quality, size and noise of the image by adapting it to the requirements each time.

The above-described method processes an initial digital image to produce a digital image in output. For example, this can be executed inside the same device used to acquire the initial digital image. The image acquisition means and the processing and memorization means necessary to execute said method are known to the skilled in the art and, therefore, will not be described more in detail.

Alternatively, the method can be executed by means of a personal computer or other similar processing means different from the image acquisition device. In this case, the initial digital image can be transferred from the acquisition device to suitable memory resources of the computer, and then processed by means of a program or computer program product, including code instructions that, if loaded and executed inside the personal computer, processes the image according to the above-described method.

While there have been described above the principles of the present invention in conjunction with specific memory architectures and methods of operation, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

We claim:

1. A method for transforming a matrix representation of pixels of an image into a vector representation of the image comprising:
  partitioning the matrix representation of pixels of the image into contiguous homogeneous regions by calculating a gradient to obtain a gradient map, sorting pixels in the gradient map and applying a watershed type morphologic algorithm to the matrix representation of pixels;
  identifying contours of the contiguous homogeneous regions by applying a vector code contouring algorithm of a chain-code type to every region; and
  outputting a vector representation of the image produced with the contiguous homogeneous regions and the identified contours,
wherein the step of calculating the gradient in order to obtain a gradient map comprises providing a gradient histogram, the step of sorting the pixels is performed on the pixels in the gradient histogram and the method is performed by an image acquisition device or by a personal computer receiving information about the matrix representation of pixels from an image acquisition device.

2. The method according to claim 1, wherein the gradient map is quantized so as to vary the quality and dimensions of the vector representation of the image.

3. The method according to claim 2, wherein the matrix representation of the pixels comprises a plurality of levels, each corresponding to a different pixel parameter, and wherein the calculation of the gradient comprises the calculation of the gradients at various levels and the association of the gradients between them, at various levels, using a Lmax type metric.

4. The method according to claim 2 wherein the matrix representation of the pixels comprises a plurality of levels, each corresponding to a different pixel parameter, and wherein the calculation of the gradient comprises the calculation of the gradients at various levels using a Lmax type metric.

5. A computer program product comprising code instructions embodied on a computer readable medium that, when loaded and executed inside a data processor, process a method for transforming a matrix representation of pixels of an image into a vector representation of the image, the method comprising:

partitioning the matrix representation of pixels of the image into contiguous homogeneous regions by calculating a gradient to obtain a gradient map, sorting pixels in the gradient map and applying a watershed type morphologic algorithm to the matrix representation of pixels; and identifying contours of the contiguous homogeneous regions by applying a vector code contouring algorithm of a chain-code type to every region; and outputting a vector representation of the image produced with the contiguous homogeneous regions and the identified contours, wherein the step of calculating the gradient in order to obtain a gradient map comprises providing a gradient histogram and the step of sorting the pixels is performed on the pixels in the gradient histogram.

6. The computer program product according to claim 5, wherein the gradient map is quantized so as to vary the quality and dimensions of the vector representation of the image.

7. The computer program product according to claim 6, wherein the matrix representation of the pixels comprises a plurality of levels, each corresponding to a different pixel parameter, and wherein the calculation of the gradient comprises the calculation of the gradients at various levels and the association of the gradients between them, at various levels, using a Lmax type metric.

8. The computer program product according to claim 6 wherein the matrix representation of the pixels comprises a plurality of levels, each corresponding to a different pixel parameter, and wherein the calculation of the gradient comprises the calculation of the gradients at various levels using a Lmax type metric.

9. The method according to claim 1, wherein the pixel sorting step comprises starting from a first pixel of a gradient histogram list, repeatedly measuring distances to other pixels and identifying those pixels that geometrically have a minimum distance.

10. The computer program product according to claim 5, wherein the pixel sorting step comprises starting from a first pixel of a gradient histogram list, repeatedly measuring distances from the first pixel to other pixels and identifying those pixels that geometrically have a minimum distance.

* * * * *